No. 871,103. PATENTED NOV. 19, 1907.
E. C. BRIDGE.
OPTICAL INSTRUMENT.
APPLICATION FILED APR. 26, 1907.
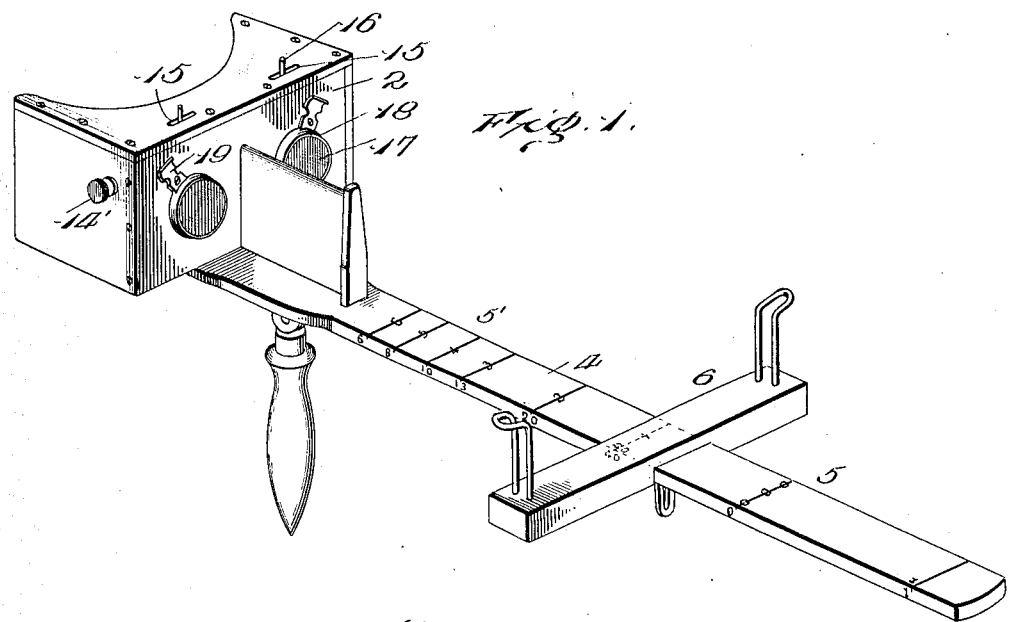
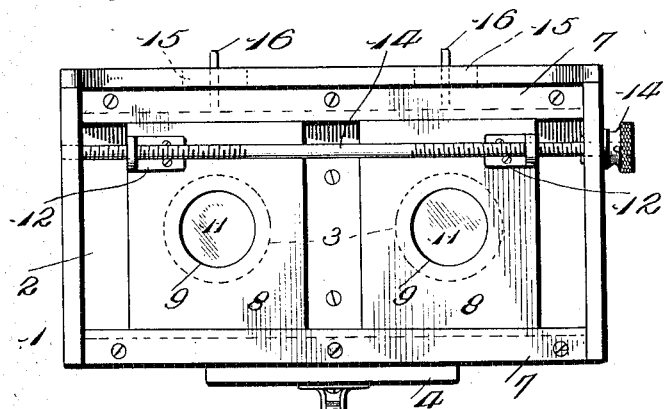
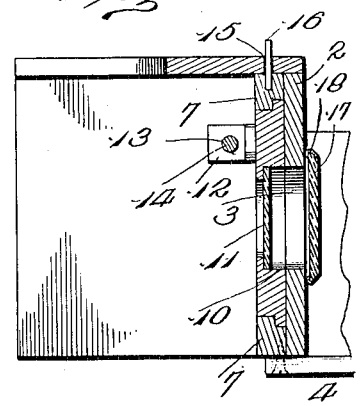
Inventor
E. C. Bridge.
Witnesses
By Dudley Browne Phelps
Attorneys

UNITED STATES PATENT OFFICE.

EPHRAIM C. BRIDGE, OF CHARITON, IOWA.

OPTICAL INSTRUMENT.

No. 871,103.　　　　　Specification of Letters Patent.　　　　　Patented Nov. 19, 1907.

Application filed April 26, 1907. Serial No. 370,476.

*To all whom it may concern:*

Be it known that I, EPHRAIM C. BRIDGE, a citizen of the United States, residing at Chariton, in the county of Lucas and State of Iowa, have invented certain new and useful Improvements in Optical Instruments, of which the following is a specification.

My invention relates to certain new and useful improvements in optical instruments, and the object of my invention is to produce an instrument which is cheap to construct, is composed of few parts, and one with which a variety of work in connection with testing and treating the eyes may be carried on.

With these objects in view, my invention consists in certain constructions, combinations and arrangement of parts, the preferred form of which will be first described in connection with the accompanying drawings, and then the invention particularly pointed out in the claims.

Referring to the drawings wherein the same part is designated by the same reference numeral wherever it occurs, Figure 1 is a perspective view of the preferred form of my invention; Fig. 2 is a front view thereof; Fig. 3 is a cross-section.

1 designates a hood having its rear side closed by the plate 2, provided with apertures 3.

4 designates the beam on which is provided scales 5 and 5', the scale 5 being laid off in accordance with the strength of the lenses used, so that at the point "0" the rays are parallel. The scale 5' is marked for the different lenses the patient may require to correct the vision. Slidingly mounted on the beam is a card holder 6.

7 designates a pair of guide ways mounted on the inner side of the plate 2.

8 designates a pair of blocks mounted to slide in the ways 7, each of these blocks being provided with a central perforation 9. The rear face of these blocks is provided with a depression 10 in which is mounted a prismatic spherical lens 11, the base of the prisms of the lenses being located toward each other. Mounted on the inner side of each of the blocks is a lug 12 provided with a threaded perforation 13.

14 is a rod mounted in the sides of the hood 1, one end of the rod extending through the hood and provided with a turning button 14. The rod is provided with right and left hand screw threads which engage the threaded openings of the lugs whereby by turning the rod the blocks carrying the lenses may be moved to or from each other.

15 are a pair of slits cut in the top of the hood and 16 are a pair of pins extending up from the upper side of the blocks 8 in line with the central axes of the lenses. By means of these pins the axes of the lenses can be located in line with the center of the pupils of the eyes of the patient to be treated.

17 are a pair of ground glasses mounted in suitable frames 18 which are pivoted at 19 to the back of the plate 2, whereby the ground glasses can be moved around to cover either opening 3 in order to treat or test the eyes of the patient separately.

In the operation of my device, the patient is first requested to look over the top of the hood, and then by turning the button 14 the pins 15 are brought just inside of the center of the pupils of the eyes. This will give the operator the pupilary distance of the patient's eyes and set the lenses the proper distance apart. A reading card of the ordinary type is now placed in the slide with the slide pushed up to No. 0 on the scale on top of the beam. If the patient can read the card at this distance he has normal vision. The test after being made for both eyes should be made for each eye singly by turning down the ground glass covers in the ordinary manner. If the patient, however, does not read clearly when the slide is at 0 on the scale, then the slide is slowly drawn in until the card can be read clearly. The scale on the side of the bar then shows the number of the lens that is required to correct the vision.

To test for astigmatism, both corneal and lenticular, an ordinary astigmatic card is placed in the slide, and the slide set at the point on the scale where the patient was able to read the reading card. If now the lines all look alike to the patient there is no astigmatism. If however some of the lines are darker than the others, then the darker line shows the Bert meridian of the cylinder. By now moving the card carrying slide towards the eyes of the patient until all the lines look alike, the strength of the cylinder can be determined. When it is desired to exercise the muscles of the eyes of the patient, he is requested to look through the instrument and then the lenses move alternately further apart and closer together, which will produce the effect of exercising the muscles of accommodation.

From the above description of the construction and operation it will be seen that I have produced a construction which is simple, cheap and not liable to get out of order, and one which has a wide range of use in optical work.

What I claim as new and desire to secure by Letters Patent is

1. An optical instrument comprising a hood, a pair of lenses mounted in the hood, means for moving the lenses toward and away from each other, a point extending up through the hood in line with the axis of each lens, whereby the relation of the lenses to the eyes of the patient can be determined, and a beam extending out from the hood carrying a slide adapted to support testing cards, a scale on the beam arranged in accordance with the strength of the lenses, and a second scale on the side of the beam arranged in accordance with the strength of lens necessary to correct the patient's vision.

2. An optical instrument comprising a hood, a pair of blocks mounted in the front of the hood, a pair of prismatic spherical lenses mounted in the blocks, a rod provided with right and left hand screw threaded portions mounted in the hood and adapted to engage correspondingly screw threaded portions on the blocks, one end of said rod extending through the hood and provided with a turning button whereby by the turning of the rod the blocks carrying the lenses may be moved toward and away from each other, the whole constituting a means whereby the muscles of the eyes of a patient may be exercised.

In testimony whereof I affix my signature in presence of two witnesses.

EPHRAIM C. BRIDGE.

Witnesses:
    PETER E. VAIL,
    LESTER F. SMITH.